US012122222B2

(12) United States Patent
Ishitobi et al.

(10) Patent No.: US 12,122,222 B2
(45) Date of Patent: Oct. 22, 2024

(54) VEHICLE DOOR BEAM AND METHOD FOR MANUFACTURING THE SAME

(71) Applicant: KABUSHIKI KAISHA KOBE SEIKO SHO (KOBE STEEL, LTD.), Hyogo (JP)

(72) Inventors: Hideki Ishitobi, Kobe (JP); Narikazu Hashimoto, Shimonoseki (JP)

(73) Assignee: Kobe Steel, Ltd., Hyogo (JP)

(*) Notice: Subject to any disclaimer, the term of this patent is extended or adjusted under 35 U.S.C. 154(b) by 57 days.

(21) Appl. No.: 17/754,523

(22) PCT Filed: Nov. 4, 2020

(86) PCT No.: PCT/JP2020/041184
§ 371 (c)(1),
(2) Date: Apr. 5, 2022

(87) PCT Pub. No.: WO2021/106511
PCT Pub. Date: Jun. 3, 2021

(65) Prior Publication Data
US 2024/0100919 A1   Mar. 28, 2024

(30) Foreign Application Priority Data
Nov. 29, 2019   (JP) ................. 2019-216551

(51) Int. Cl.
*B60J 5/04* (2006.01)
(52) U.S. Cl.
CPC ................. *B60J 5/0444* (2013.01)

(58) Field of Classification Search
None
See application file for complete search history.

(56) References Cited

U.S. PATENT DOCUMENTS

2018/0236851 A1* 8/2018 Shimoaka .............. B60J 5/0444

FOREIGN PATENT DOCUMENTS

| DE | 10 2012 012 811 A1 | 12/2012 |
|----|---|---|
| JP | 2003-252056 A | 9/2003 |
| JP | 2008-068822 A | 3/2008 |
| JP | 2015-147490 A | 8/2015 |
| JP | 2018-090061 A | 6/2018 |
| JP | 2019-073044 A | 5/2019 |

* cited by examiner

*Primary Examiner* — Anthony M Liang
(74) *Attorney, Agent, or Firm* — Studebaker & Brackett PC

(57) ABSTRACT

A door beam includes an outer flange, an inner flange, and a pair of webs connecting the outer flange and the inner flange. The outer flange, the inner flange, and the pair of webs define a closed cross-sectional portion. The outer flange includes an outer central portion constituting the closed cross-sectional portion, and outer protruding portions protruding outward from the closed cross-sectional portion. The inner flange is formed with an attachment press working portion having been subjected to press working so as to serve as an attachment portion with respect to the inner panel at both end portions in the longitudinal direction. The outer protruding portion is formed with a mastic press working portion having been subjected to press working so as to serve as an attachment portion with respect to the outer panel.

11 Claims, 16 Drawing Sheets

VEHICLE DOOR BEAM AND METHOD FOR MANUFACTURING THE SAME

CROSS-REFERENCE TO RELATED APPLICATIONS

This is a national phase application in the United States of International Patent Application No. PCT/JP2020/041184 with an international filing date of Nov. 4, 2020, which claims priority of Japanese Patent Application No. 2019-216551 filed on Nov. 29, 2019 the contents of which are incorporated herein by reference.

TECHNICAL FIELD

The present invention relates to a vehicle door beam and a method for manufacturing the same.

BACKGROUND ART

A vehicle door beam is a component for preventing a collision object from entering a vehicle interior space at the time of side collision, and is disposed between an inner panel and an outer panel of a vehicle door. The vehicle door beam may be made of an extrusion material of an aluminum alloy with emphasis on lightweight properties. Such a door beam includes, for example, an outer flange, an inner flange, and a pair of webs connecting the outer flange and the inner flange.

In a general assembly process of a vehicle door, brackets are assembled to both end portions of the inner flange in the longitudinal direction by bolts, welding, or the like, and then the inner flange is attached to the inner panel via the brackets. Thereafter, the outer flange and the outer panel are joined with an adhesive. Such a joint portion formed by the adhesive is also referred to as a mastic portion. By joining the outer flange to the outer panel at the mastic portion, the tension rigidity and dent resistance of the outer panel are secured. For example, such a door beam is disclosed in JP 2018-90061 A and JP 2019-73044 A.

SUMMARY

In the door beam of JP 2018-90061 A, the door beam is attached to the inner panel via the brackets after the brackets are assembled to the door beam. For this reason, there is a possibility that a dimensional variation occurs due to the assembly of the brackets. In the vehicle door, it is preferable to keep the distance between the outer panel and the outer flange small and constant from the viewpoint of tension rigidity and dent resistance. However, when a dimensional variation occurs due to the assembly of the brackets, it is difficult to keep the distance between the outer panel and the outer flange small and constant. Therefore, when the door beam is attached via the brackets, a product defect cannot be reduced, and an inspection process and a correction process may be required.

In the door beam of JP 2019-73044 A, a ridge portion is formed on an outer flange of the door beam, and the ridge portion is cut as necessary to adjust a distance between the outer flange and the outer panel. As a result, it is possible to improve the problem associated with the dimensional variation, but there is a possibility that the number of steps increases along with the cutting work and the bending strength of the cut portion decreases.

An object of the present invention is to provide a vehicle door beam that can be easily attached with high dimensional accuracy and a method for manufacturing the same.

A first aspect of the present invention provides a vehicle door beam disposed between an outer panel and an inner panel of a vehicle door and made of an extrusion material of an aluminum alloy, the vehicle door beam including: an outer flange facing the outer panel; an inner flange facing the inner panel; and a pair of webs connecting the outer flange and the inner flange, in which the outer flange, the inner flange, and the pair of webs define a closed cross-sectional portion, in which the outer flange includes an outer central portion constituting a part of the closed cross-sectional portion and an outer protruding portion protruding outward from the closed cross-sectional portion, in which the inner flange or the outer flange is formed with an attachment press working portion having been subjected to press working so as to serve as an attachment portion with respect to the inner panel at at least one end portion in a longitudinal direction, and in which the outer protruding portion is formed with a mastic press working portion having been subjected to press working so as to serve as a mastic portion with respect to the outer panel.

According to this configuration, since the attachment press working portion integrally formed with the vehicle door beam functions as the attachment portion, it is not necessary to assemble additional components such as brackets to the attachment press working portion. Therefore, in the attachment press working portion, a dimensional variation due to assembly of additional components such as the brackets do not occur. In addition, since the attachment press working portion and the mastic press working portion are subjected to press working, high dimensional accuracy can be secured. Therefore, the tension rigidity and the dent resistance of the outer panel can be improved. This is because the spring back amount is large and high dimensional accuracy cannot be secured in general bending, whereas the spring back amount can be reduced because plastic deformation occurs in press working. Therefore, it is possible to provide a vehicle door beam that can be easily attached with high dimensional accuracy.

The inner flange or the outer flange may be formed with the attachment press working portion at each of both end portions in the longitudinal direction.

According to this configuration, the vehicle door beam can be attached to the inner panel without the brackets at both end portions in the longitudinal direction. In general, the vehicle door beam is attached to the inner panel at both end portions in the longitudinal direction. In the above configuration, since the attachment press working portion serving as the attachment portion is formed at each of both end portions in the longitudinal direction, the brackets can be omitted at both end portions in the longitudinal direction.

In the inner flange and the outer flange, both end portions in the longitudinal direction excluding the attachment press working portion and the mastic press working portion may be removed.

According to this configuration, it is possible to achieve weight reduction while leaving portions necessary for attaching the vehicle door beam and a portion necessary for maintaining the strength in the inner flange and the outer flange. Here, the portions necessary for attaching the vehicle door beam refer to the attachment press working portion and the mastic press working portion, which are portions necessary for attaching the vehicle door beam to the inner panel and the outer panel, respectively. The portion necessary for maintaining the strength refers to a central portion in the longitudinal direction, which is a portion to which a large bending moment is applied, and is a portion which greatly contributes to the bending strength.

The vehicle door beam may be made of an extrusion material of an aluminum alloy of 6000 series or 7000 series.

According to this configuration, by using an extrusion material made of a high-strength aluminum alloy of 6000 series or 7000 series, a high strength vehicle door beam can be realized.

The outer protruding portion may be thinner than the outer central portion.

According to this configuration, the thickness of the outer protruding portion to be subjected to press working can be reduced, and workability can be improved. In particular, in the extrusion material, it is easy to change such a partial thickness.

A second aspect of the present invention provides a method for manufacturing a vehicle door beam disposed between an outer panel and an inner panel of a vehicle door, the method including: forming an extrusion material by extruding a material of an aluminum alloy, the extrusion material including an outer flange facing the outer panel, an inner flange facing the inner panel, and a pair of webs connecting the outer flange and the inner flange, the outer flange, the inner flange, and the pair of webs defining a closed cross-sectional portion, the outer flange including an outer central portion constituting the closed cross-sectional portion and an outer protruding portion protruding outward from the closed cross-sectional portion; cutting the extrusion material to a predetermined length; and forming a mastic press working portion serving as a mastic portion with respect to the outer panel on the outer protruding portion by performing press working on the cut extrusion material at the same time or in the same process as formation of an attachment press working portion serving as an attachment portion with respect to the inner panel at at least one end portion in a longitudinal direction on the inner flange or the outer flange.

According to this method, as described above, it is possible to provide a method for manufacturing a vehicle door beam that can be easily attached with high dimensional accuracy. In particular, in the above method, since the attachment press working portion and the mastic press working portion are formed at the same time or in the same process, the manufacturing process can be simplified and the dimensional accuracy can be further improved.

The extrusion material may be made of an aluminum alloy of 6000 series or 7000 series, and be subjected to a heat softening treatment before or during the press working.

According to this method, by the heat softening treatment, it is possible to suppress a crack, residual stress, stress corrosion cracking (SCC) caused by a corrosive environment, or the like when an extrusion material made of a high-strength aluminum alloy of 6000 series or 7000 series is subjected to press working. Extrusion materials made of aluminum alloys generally have high strength, and particularly, extrusion materials made of high-strength aluminum alloys of 6000 series or 7000 series are usually not suitable for press working which may be accompanied by cracking or the like. However, in the above method, cracking or the like is suppressed by devising the heat softening treatment described above, and it is possible to press an extrusion material made of a high-strength aluminum alloy. Here, the heat softening treatment includes a restoration treatment or a solution treatment by high heat, and also includes warm forming in which press working is performed at a high temperature.

The extrusion material may be made of an aluminum alloy of 6000 series or 7000 series, the extrusion material may be cut immediately after formation of the extrusion material, and the press working may be performed after the cutting and before natural aging of the extrusion material proceeds.

According to this method, the extrusion material made of a high-strength aluminum alloy of 6000 series or 7000 series can be subjected to cutting work and press working before the extrusion material is hardened to a certain extent by natural aging. Therefore, cracking associated with cutting work and press working can be suppressed. Preferably, press working is performed before the Vickers hardness of the extrusion material becomes 80 Hv or more.

According to the present invention, in the vehicle door beam and the method for manufacturing the same, since the attachment press working portion and the mastic press working portion having been subjected to press working are integrally formed with the vehicle door beam, attachment can be easily performed with high dimensional accuracy.

MODE FOR CARRYING OUT THE INVENTION

Hereinafter, embodiments of the present invention will be described with reference to the accompanying drawings.

Figure 1:
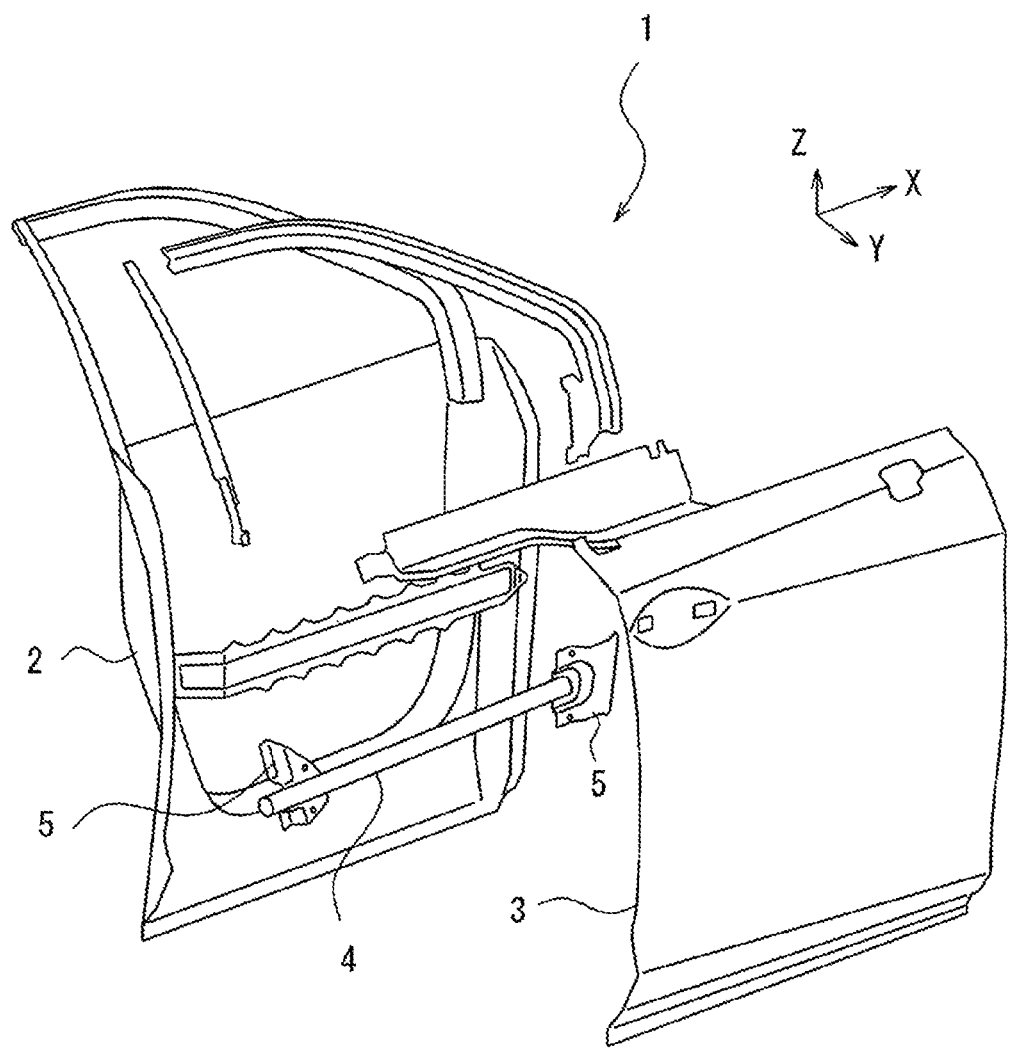
FIG. 1 is an exploded perspective view of a vehicle door.

Referring to FIG. 1, in a general vehicle door 1, a vehicle door beam 4 extending in the front-rear direction of the vehicle is disposed between an inner panel 2 and an outer panel 3 in the vehicle width direction. The vehicle door beam 4 illustrated in FIG. 1 is a conventional beam different from that of the present embodiment. The vehicle door beam 4 is a metal pipe having a circular cross section. The vehicle door beam 4 is attached to the inner panel 2 via brackets 5 at both end portions in the longitudinal direction (vehicle front-rear direction). Here, the X direction indicates the front of the vehicle, the Y direction indicates the outer side of the vehicle in the width direction, and the Z direction indicates the upper side of the vehicle.

Figure 2:
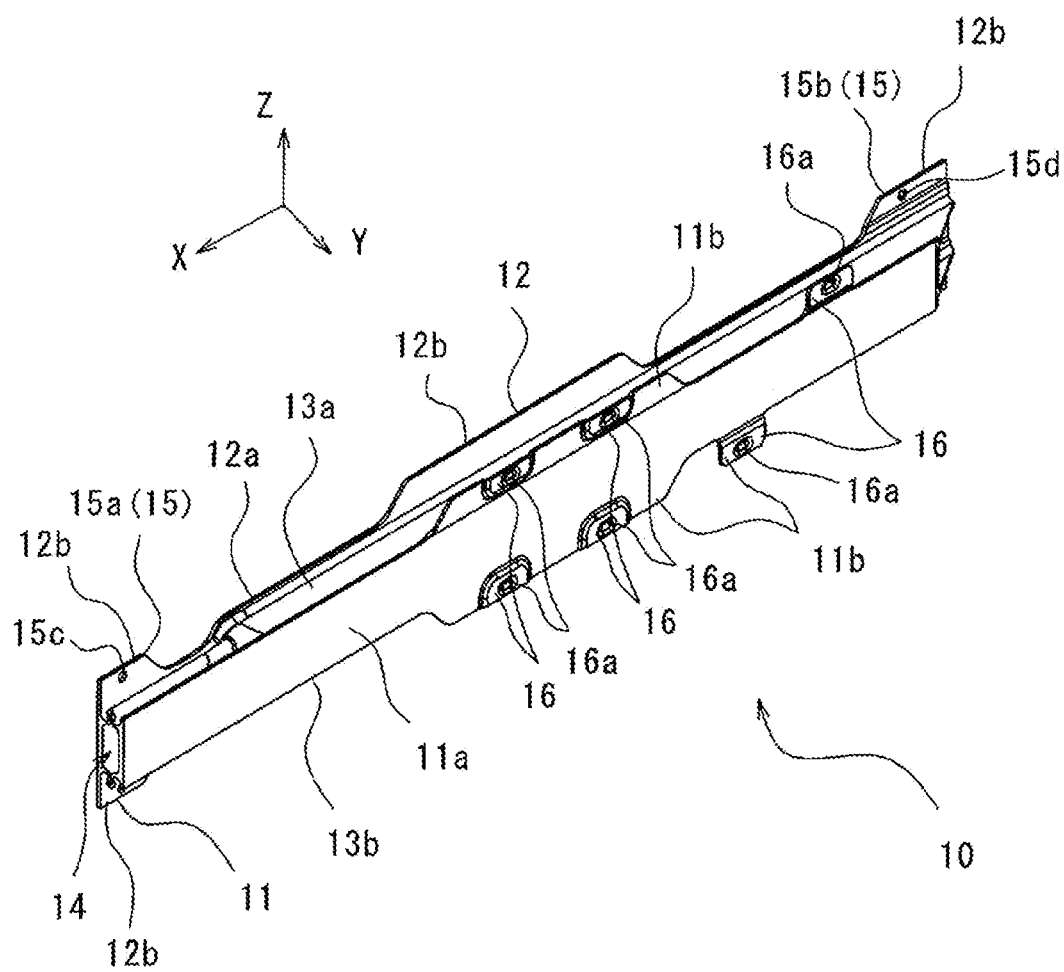
FIG. 2 is a first perspective view of a vehicle door beam according to an embodiment of the present invention.
Figure 3:
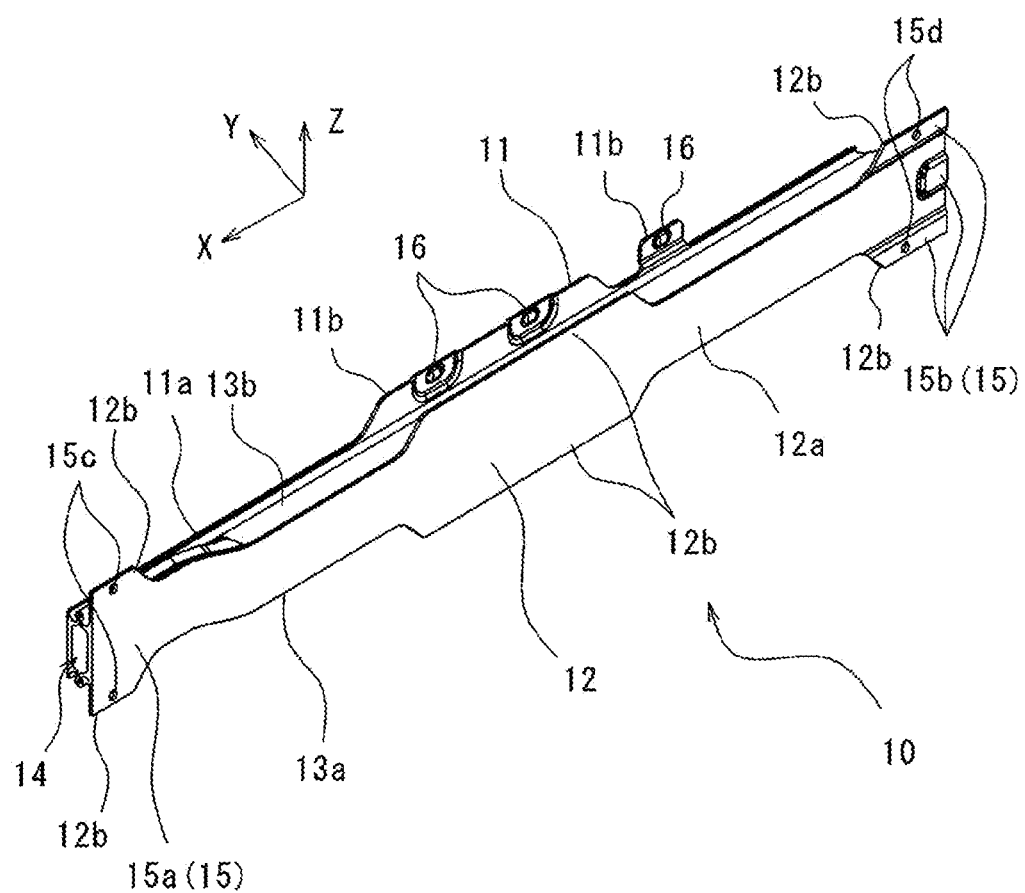
FIG. 3 is a second perspective view of the vehicle door beam according to the embodiment of the present invention.
Figure 4:
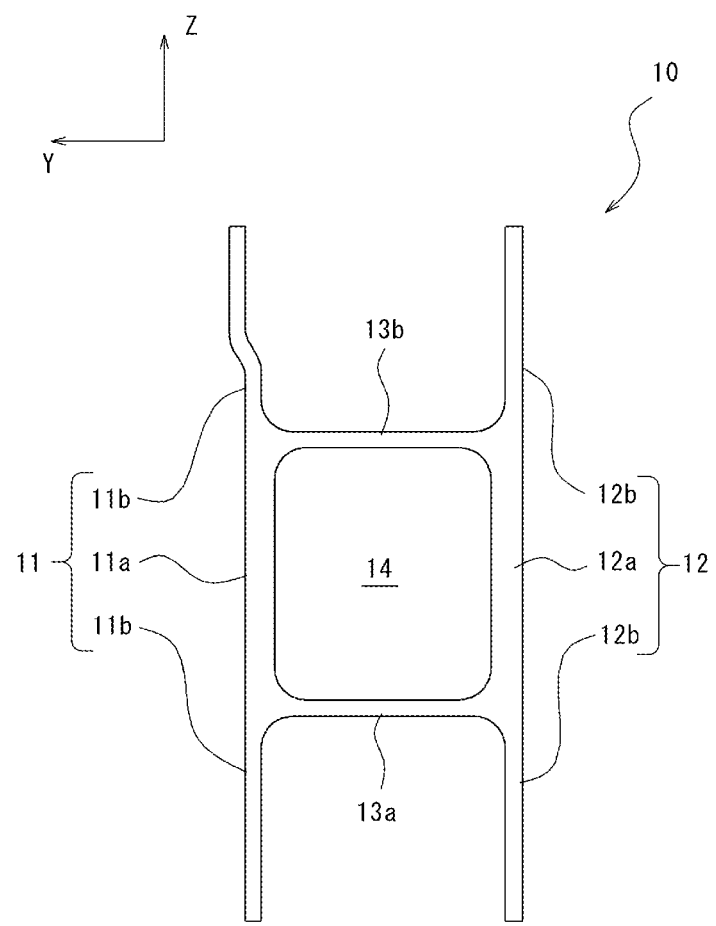
FIG. 4 is an end view perpendicular to the longitudinal direction of the vehicle door beam at the center in the longitudinal direction.

Referring to FIGS. 2 to 4, a configuration of a vehicle door beam (hereinafter, also simply referred to as a door beam) 10 of the present embodiment will be described. The door beam 10 of the present embodiment is the same in arrangement as the conventional door beam 4 of FIG. 1, but is different in shape and attachment mode. In the door beam 10 of the present embodiment, the brackets 5 as illustrated in FIG. 1 are unnecessary for attachment to the inner panel 2. In order to attach the door beam 10 without using the brackets 5, it is necessary to manufacture the door beam 10 having high dimensional accuracy. In the present embodiment, in order to secure high dimensional accuracy, press working is applied to the door beam 10 as described later.

Referring to FIGS. 2 and 3, the door beam 10 is made of an extrusion material of an aluminum alloy, preferably an extrusion material of an aluminum alloy of 6000 series or 7000 series. By using an extrusion material made of a high-strength aluminum alloy of 6000 series or 7000 series, a high strength door beam 10 can be realized. The door beam 10 includes an outer flange 11 facing the outer panel 3 (see FIG. 1), an inner flange 12 facing the inner panel 2 (see FIG. 1), and a pair of webs 13a and 13b connecting the outer flange 11 and the inner flange 12. The outer flange 11 and the inner flange 12 are disposed parallel to each other. The pair of webs 13a and 13b is disposed parallel to each other and perpendicular to both the flanges 11 and 12.

Referring to FIG. 4, the outer flange 11 and the inner flange 12 extend in the vertical direction of the vehicle and have surfaces perpendicular to the vehicle width direction. The pair of webs 13a and 13b extends in the vehicle width direction and has a surface perpendicular to the vertical direction of the vehicle. The outer flange 11, the inner flange 12, and the pair of webs 13a and 13b define a rectangular closed cross-sectional portion 14. Specifically, the outer flange 11 includes an outer central portion 11a constituting a part of the closed cross-sectional portion 14, and outer protruding portions 11b protruding outward from the closed cross-sectional portion 14. Similarly, the inner flange 12 includes an inner central portion 12a constituting a part of the closed cross-sectional portion 14 and inner protruding portions 12b protruding outward from the closed cross-sectional portion 14. In other words, specifically, the outer central portion 11a, the inner central portion 12a, and the pair of webs 13a and 13b define the closed cross-sectional portion 14.

In the present embodiment, the outer protruding portions 11b are thinner than the outer central portion 11a. Similarly, the inner protruding portions 12b are thinner than the inner central portion 12a. For example, the outer protruding portions 11b may be 2.0 mm, the outer central portion 11a may be 3.7 mm, the inner protruding portions 12b may be 2.2 mm, and the inner central portion 12a may be 4.0 mm. In addition, the amount of protrusion of each of the outer protruding portions 11b and the inner protruding portions 12b from the closed cross-sectional portion 14 may be 26 mm.

Referring to FIG. 3, the inner flange 12 is formed with an attachment press working portion 15 having been subjected to press working so as to serve as an attachment portion with respect to the inner panel 2 at both end portions in the longitudinal direction. The attachment press working portion 15 includes a front attachment portion 15a formed on the vehicle front side and a rear attachment portions 15b formed on the vehicle rear side.

The front attachment portion 15a is formed by crushing the pair of webs 13a and 13b so as to bring the inner flange 12 close to the outer flange 11. In other words, the position of the outer flange 11 is not changed by press working, and only the position of the inner flange 12 is changed by press working. Screw holes 15c for attachment to the inner panel 2 are formed in the front attachment portion 15a.

The rear attachment portions 15b are formed by performing press working on the outer protruding portion 11b and the outer central portion 11a inward in the vehicle width direction. In the present embodiment, in order to perform press working on the outer central portion 11a, the inner flange 12 and the pair of webs 13a and 13b are partially cut out at the end portion on the vehicle rear side. Screw holes 15d for attachment to the inner panel 2 are also formed in the rear attachment portions 15b.

In the present embodiment, the attachment press working portion 15 (front attachment portion 15a, rear attachment portions 15b) is provided at both end portions in the longitudinal direction, but the attachment press working portion 15 may be provided only at one end portion in the longitudinal direction. In this case, the door beam 10 may be attached to the inner panel 2 via the bracket 5 as illustrated in FIG. 1 at the end portion on the side where the attachment press working portion 15 is not provided.

Referring to FIG. 2, the outer protruding portion 11b of the outer flange 11 is formed with mastic press working portions 16 having been subjected to press working so as to serve as a mastic portion with respect to the outer panel 3. The mastic press working portions 16 are provided substantially at the center in the longitudinal direction of the door beam 10, and are formed by performing press working on the outer protruding portion 11b outward in the vehicle width direction. The mastic press working portions 16 are formed in a substantially semicircular shape at a plurality of places (5 places in the present embodiment) at the edges of the outer protruding portions 11b. In addition, the mastic press working portion 16 is provided with a recessed portion 16a so that an adhesive is accumulated on a surface facing the outer panel 3. However, when the viscosity of the adhesive is high, the recessed portion 16a may not be provided. The outer central portion 11a is not provided with the mastic press working portion 16.

In the present embodiment, in order to reduce the weight of the door beam 10, in the inner flange 12 and the outer flange 11, both end portions in the longitudinal direction excluding the attachment press working portion 15 and the mastic press working portions 16 are trimmed (removed). Preferably, from the viewpoint of achieving both weight reduction and bending strength, the both end portions in the longitudinal direction indicate portions having a length of about ⅓ or ¼ from the both ends with respect to the entire length of the door beam 10 in the longitudinal direction.

Figure 5:
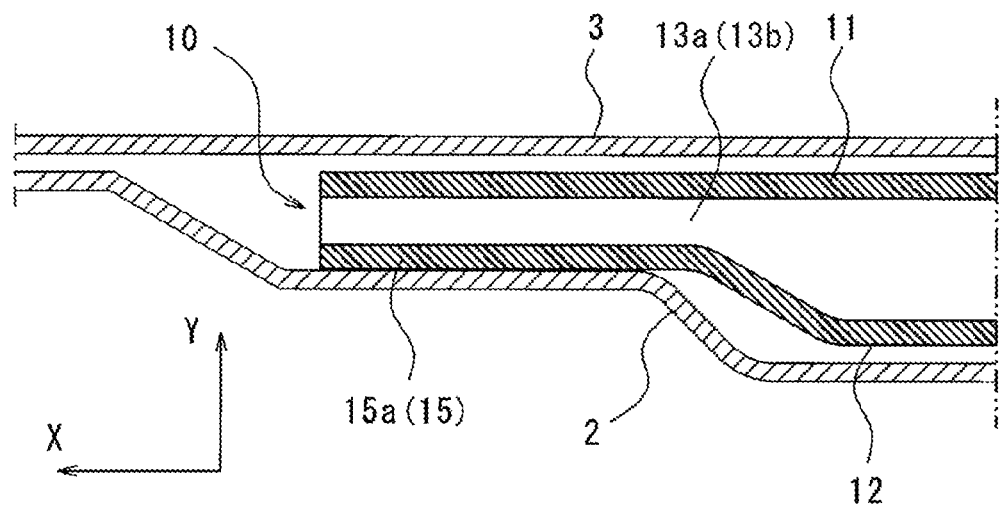
FIG. 5 is a schematic cross-sectional view illustrating an attachment mode of the vehicle door beam on a vehicle front side.

Attachment modes of the door beam 10 will be described with reference to FIGS. 5 and 6. FIG. 5 is a schematic cross-sectional view illustrating an attachment mode of the door beam 10 on the vehicle front side, and FIG. 6 is a schematic cross-sectional view illustrating an attachment mode of the door beam 10 on the vehicle rear side.

As illustrated in FIG. 5, on the vehicle front side, the door beam 10 is attached to the inner panel 2 at the front attachment portion 15a. The dimension of the front attachment portion 15a in the vehicle width direction is adjusted with high accuracy by press working, and the front attachment portion 15a is in contact with the inner panel 2. The front attachment portion 15a is attached to the inner panel 2 by bolting via the screw holes 15c (see FIG. 3).

Figure 6:
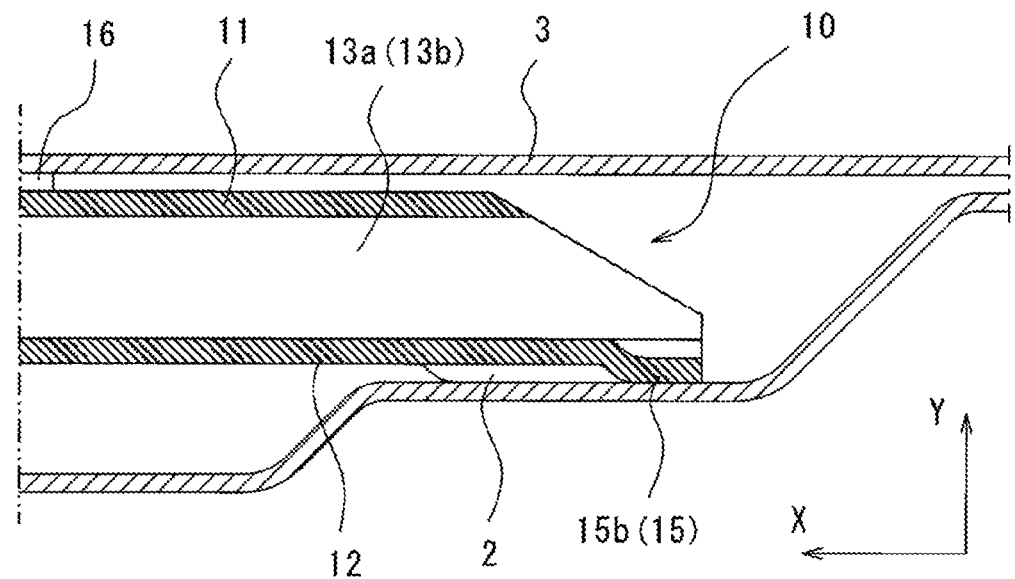
FIG. 6 is a schematic cross-sectional view illustrating the attachment mode of the vehicle door beam on the vehicle rear side.

As illustrated in FIG. 6, on the vehicle rear side, the door beam 10 is attached to the inner panel 2 and the outer panel 3 at the rear attachment portions 15b and the mastic press working portions 16, respectively. The dimension of the rear attachment portions 15b in the vehicle width direction is adjusted with high accuracy by press working, and the rear attachment portion 15b is in contact with the inner panel 2. The rear attachment portions 15b are attached to the inner panel 2 by bolting via the screw holes 15d (see FIG. 3). Similarly, the dimension of the mastic press working portions 16 in the vehicle width direction is adjusted with high accuracy by press working, and the mastic press working portions 16 are in contact with the outer panel 3. Specifically, the mastic press working portions 16 are bonded to the outer panel 3 by applying an adhesive (mastic material).

Although not illustrated in detail, the door beam 10 is attached to the outer panel 3 at the mastic press working portions 16 at the central portion in the longitudinal direction. Also at the center portion in the longitudinal direction, as described above, the dimension of the mastic press working portions 16 in the vehicle width direction is adjusted with high accuracy by press working, and the mastic press working portions 16 are bonded to the outer panel 3.

According to the door beam 10 of the present embodiment, since the attachment press working portion 15 formed integrally with the door beam 10 functions as an attachment portion, it is not necessary to assemble additional components such as the brackets 5 (see FIG. 1). Therefore, in the attachment press working portion 15, a dimensional variation due to assembly of additional components such as the brackets 5 do not occur. In addition, since the attachment press working portion 15 and the mastic press working portions 16 are subjected to press working, high dimensional accuracy can be secured, and the tension rigidity and the dent resistance in the outer panel 3 can be improved. This is because the spring back amount is large and high dimensional accuracy cannot be secured in general bending, whereas the spring back amount can be reduced because plastic deformation occurs in press working. Therefore, it is possible to provide the door beam 10 that can be easily attached with high dimensional accuracy.

Further, in the present embodiment, since the attachment press working portion 15 (front attachment portion 15a, rear attachment portions 15b) is formed at both end portions in the longitudinal direction, the door beam 10 can be attached to the inner panel 2 without the brackets 5 (see FIG. 1) at both end portions in the longitudinal direction.

In addition, since both end portions in the longitudinal direction excluding the attachment press working portion 15 and the mastic press working portions 16 are removed, the weight of the door beam 10 is reduced. That is, the weight is reduced while leaving portions necessary for attaching the door beam 10 and a portion necessary for maintaining the strength. Here, the portions necessary for attaching the door beam 10 refer to the attachment press working portion 15 and the mastic press working portions 16, which are portions necessary for attaching the door beam 10 to the inner panel 2 and the outer panel 3, respectively. The portion necessary for maintaining the strength refers to a central portion in the longitudinal direction, which is a portion to which a large bending moment is applied, and is a portion which greatly contributes to the bending strength.

Further, since the outer protruding portions 11b are formed to be thinner than the outer central portion 11a, press working is easy. That is, the workability is improved by reducing the thickness of the outer protruding portions 11b to be subjected to press working. In particular, in the extrusion material, it is easy to change such a partial thickness.

A method for manufacturing the door beam 10 will be described.

Figure 7:
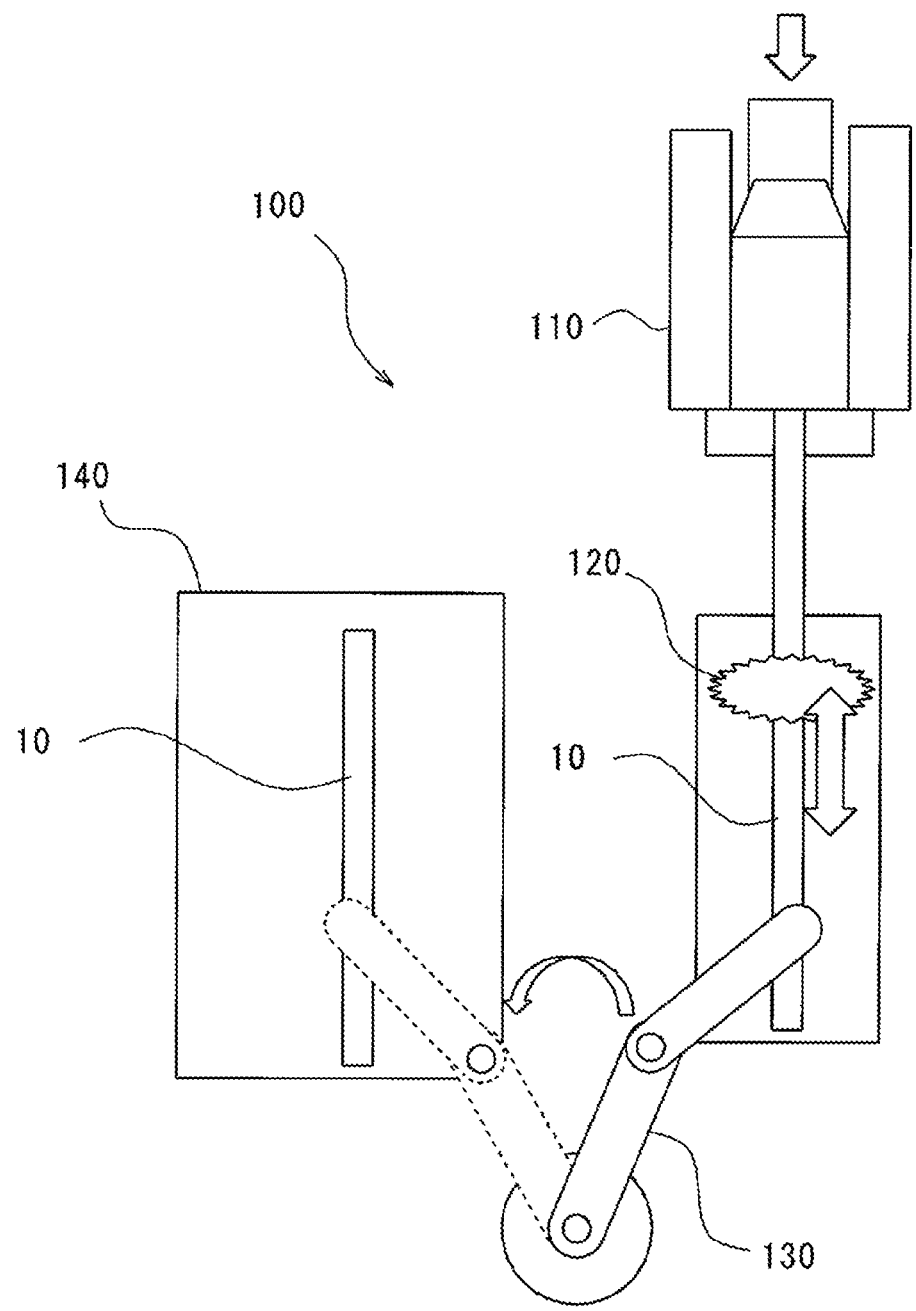
FIG. 7 is a conceptual diagram of a manufacturing apparatus that executes a method for manufacturing a vehicle door beam.

FIG. 7 illustrates a manufacturing apparatus 100 for use in the method for manufacturing the door beam 10. The manufacturing apparatus 100 includes an extruder 110, a cutting machine 120, a robot arm 130, and a pressing machine 140. The extruder 110 is a machine that extrudes the extrusion material 10 made of an aluminum alloy. The cutting machine 120 is a machine that cuts the extrusion material 10 extruded from the extruder 110. The cutting machine 120 is configured to be movable in the extrusion direction of the extruder 110. The robot arm 130 is a machine that transports the extrusion material 10 cut by the cutting machine 120 to the pressing machine 140. The pressing machine 140 is a machine that performs press working on the extrusion material 10. The same reference numeral 10 is used for the door beam and the extrusion material because the extrusion material is processed into the door beam.

In the method for manufacturing the door beam 10 of the present embodiment, as a first process, a material an aluminum alloy is extruded from the extruder 110. As a result, the extrusion material 10 of an aluminum alloy is formed. The extrusion material 10 includes the outer flange 11 facing the outer panel 3, the inner flange 12 facing the inner panel 2, and the pair of webs 13a and 13b connecting the outer flange 11 and the inner flange 12. Here, the outer flange 11, the inner flange 12, and the pair of webs 13a and 13b define the closed cross-sectional portion 14. Specifically, the outer flange 11 includes the outer central portion 11a constituting the closed cross-sectional portion 14, and the outer protruding portions 11b protruding outward from the closed cross-sectional portion 14. Similarly, the inner flange 12 includes the inner central portion 12a constituting the closed cross-sectional portion and the inner protruding portions 12b protruding outward from the closed cross-sectional portion.

Figure 8:
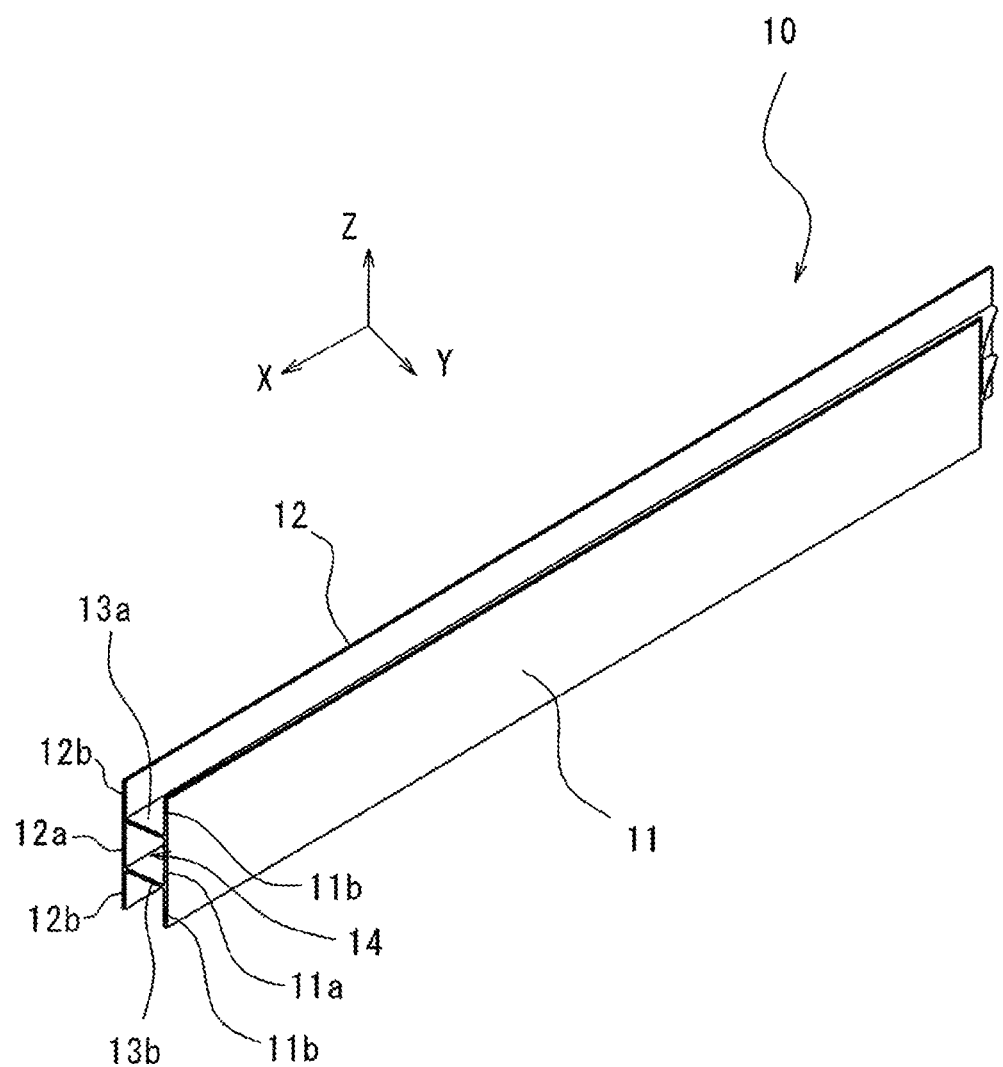
FIG. 8 is a perspective view of an extrusion material after cutting work.

As a second process, as illustrated in FIG. 8, the extrusion material 10 is cut into a predetermined length suitable as the door beam 10 by the cutting machine 120 (see FIG. 7). At this time, the cutting machine 120 cuts the extrusion material 10 not perpendicularly to the longitudinal direction but to be inclined. Specifically, the extrusion material 10 is cut such that the inner flange 12 is shorter than the outer flange 11. Alternatively, after the extrusion material 10 is cut perpendicularly to the longitudinal direction, the inner flange 12 and the pair of webs 13a and 13b may be partially cut out at the end portion. Thus, the rear attachment portions 15b (see FIG. 11) can be easily formed by press working described later. The extrusion material 10 cut by the cutting machine 120 is conveyed to the pressing machine 140 (see FIG. 7) by the robot arm 130 (see FIG. 7).

As a third process, the cut extrusion material 10 is subjected to press working by the pressing machine 140 as follows.

Figure 9:
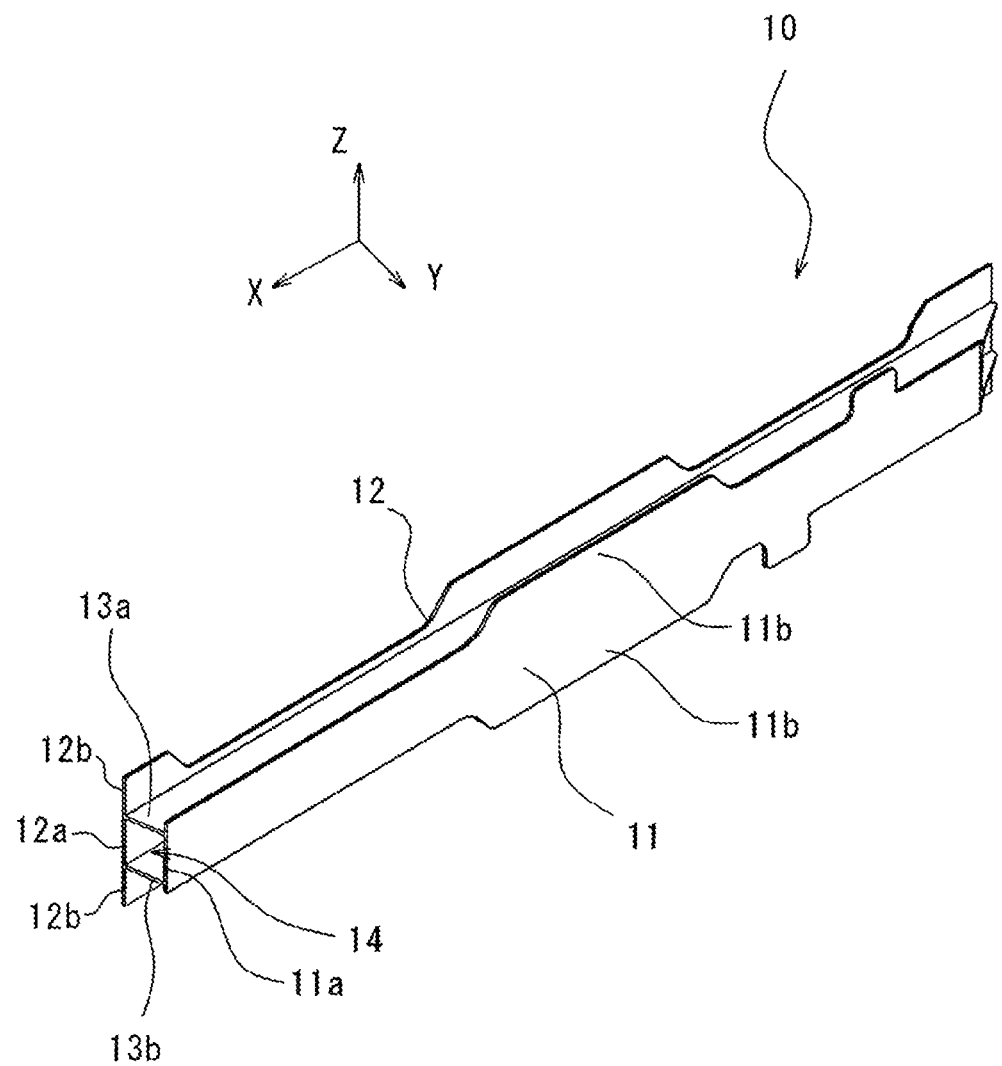
FIG. 9 is a perspective view of the extrusion material after trimming.

In the press working, first, as illustrated in FIG. 9, a part of the outer flange 11 and the inner flange 12 is punched out and trimmed for weight reduction. Specifically, in the outer flange 11 and the inner flange 12, both end portions in the longitudinal direction excluding the attachment press working portion 15 and the mastic press working portions 16 are removed. As a result, as described above, the weight can be reduced while leaving the portions necessary for attaching the door beam 10 and the portion necessary for maintaining the strength.

Figure 10:
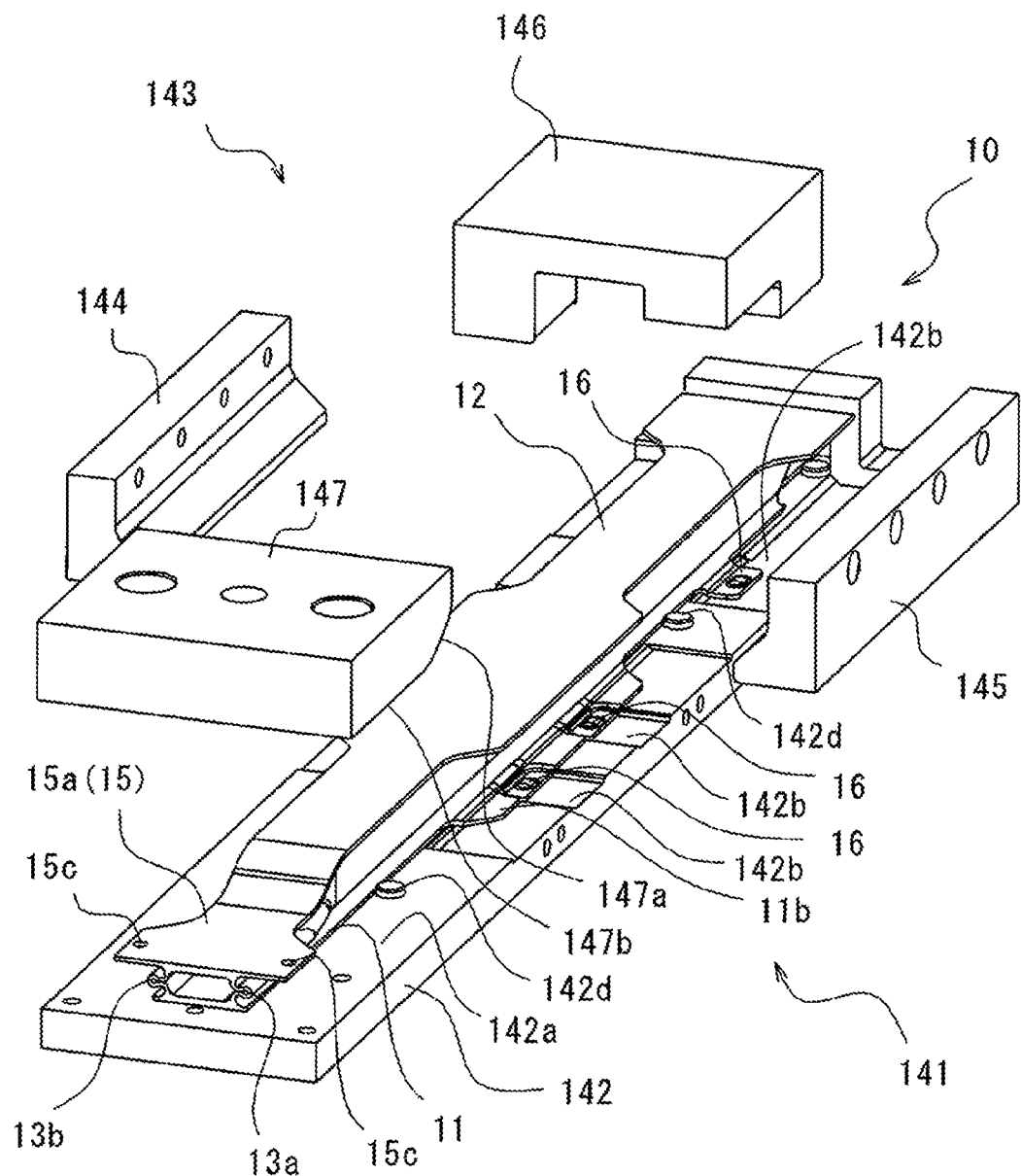
FIG. 10 is a first exploded perspective view of a mold used in press working.
Figure 11:
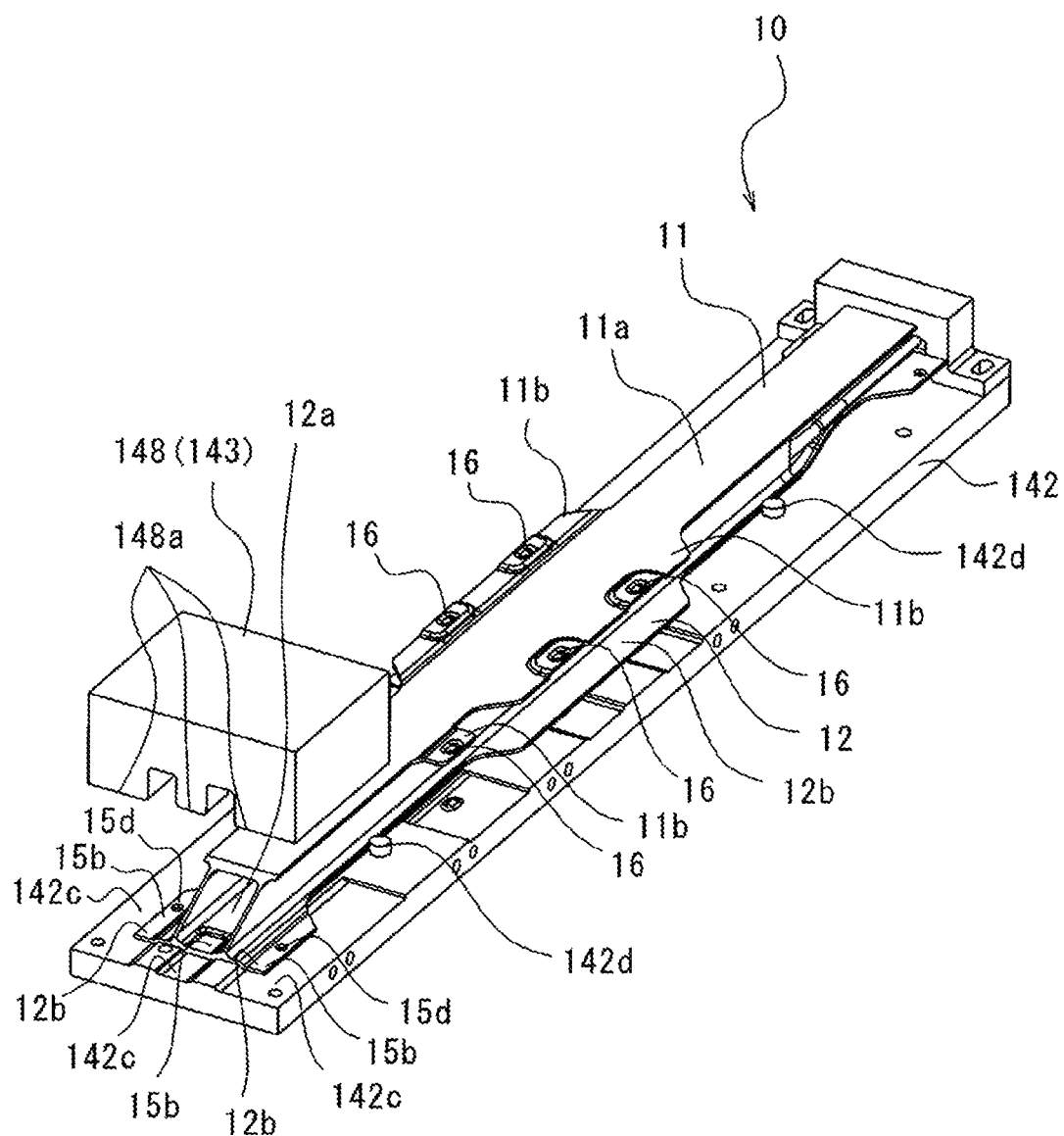
FIG. 11 is a second exploded perspective view of the mold used in press working.

In the press working, next, as illustrated in FIGS. 10 and 11, the extrusion material 10 is subjected to press working to form the attachment press working portion 15 and the mastic press working portions 16. In such press working, a mold 141 set in the pressing machine 140 (see FIG. 7) is used.

Referring to FIG. 10, the mold 141 includes an integrated lower mold 142 and an upper mold 143 divided into a plurality of pieces. In FIG. 10, the extrusion material 10 after being subjected to press working using the mold 141 is illustrated. In the press working of FIG. 10, the press working is performed by lowering the upper mold 143 in a state where the outer flange 11 is placed on the lower mold 142.

The lower mold 142 has a flat surface 142a on the upper surface and recessed portions 142b having a recessed shape with respect to the flat surface 142a. The recessed portions 142b are provided corresponding to the mastic press working portions 16. The lower mold 142 is provided with a plurality of positioning pins 142d for positioning the extrusion material 10.

The upper mold 143 includes first to fourth punches 144 to 147.

The first to third punches 144 to 146 are portions for forming the mastic press working portions 16, and perform press working the outer protruding portions 11b. Although not illustrated in detail, each of the first to third punches 144 to 146 has a projecting portion corresponding to the recessed portion 142b of the lower mold 142 on the lower surface. In the press working of the outer protruding portions 11b, the deformation amount (pushing amount) of the press working is determined by the depths of the recessed portions 142b and the height of the corresponding projecting portions. By adjusting the deformation amount (pushing amount), it is possible to reduce the distance between the outer panel 3 (see FIG. 1) and the mastic press working portions 16 when the door beam 10 is attached to the outer panel 3. That is, the door beam 10 can be attached to the outer panel 3 with high accuracy.

The fourth punch 147 is a portion for forming the front attachment portion 15a. At the same time, the screw holes 15c may be formed in the front attachment portion 15a. The fourth punch 147 has a pressing surface 147a which is curved and a flat pressing surface 147b on the lower surface. The pressing surfaces 147a and 147b are continuous. The fourth punch 147 presses the inner flange 12 by the pressing surfaces 147a and 147b to crush the pair of webs 13a and 13b. In the press working by the fourth punch 147, it is possible to reduce the distance between the inner panel 2 and the front attachment portion 15a when the door beam 10 is attached to the inner panel 2 by adjusting the crushing amount. That is, the door beam 10 can be attached to the inner panel 2 with high accuracy.

In particular, in the press working, the front attachment portion 15a is formed in the inner flange 12 at one end portion in the longitudinal direction, and at the same time (or in the same process), the mastic press working portions 16 are formed in the outer protruding portions 11b. Therefore, the dimension of the interval between the front attachment portion 15a and the mastic press working portions 16 can be accurately defined in the vehicle width direction.

Referring to FIG. 11, in the present embodiment, the rear attachment portions 15b are also formed by press working. At the same time, the screw holes 15d may be formed in the rear attachment portions 15b. In FIG. 11, the extrusion material 10 after being pressed using the mold 141 is illustrated. In the press working of FIG. 11, the press working is performed by lowering the upper mold 143 in a state where the inner flange 12 is placed on the lower mold 142.

The lower mold 142 illustrated in FIG. 11 is common to that illustrated in FIG. 10. The lower mold 142 has recessed portions 142c having a recessed shape with respect to the flat surface 142a. The recessed portions 142c are provided corresponding to the attachment press working portion 15 (rear attachment portions 15b). The upper mold 143 includes a fifth punch 148. The fifth punch 148 has projecting portions 148a corresponding to the recessed portions 142c of the lower mold 142 on the lower surface. Therefore, the rear attachment portions 15b are formed so as to be sandwiched between the recessed portions 142c and the projecting portions 148a.

In this way, by being subjected to press working by the mold 141 set in the pressing machine 140, the attachment press working portion 15 and the mastic press working portions 16 are formed on the extrusion material 10, and the door beam 10 is configured.

According to the method for manufacturing the door beam 10 of the present embodiment, as described above, the vehicle door beam 10 that can be easily attached with high dimensional accuracy can be manufactured. In particular, in the present embodiment, since the attachment press working portion 15 and the mastic press working portions 16 are formed at the same time (or in the same process), the manufacturing process can be simplified and the dimensional accuracy can be further improved.

Preferably, the extrusion material 10 is made of an aluminum alloy of 6000 series or 7000 series and is subjected to a heat softening treatment before or during the press working. Here, the heat softening treatment includes a restoration treatment or a solution treatment by high heat, and also includes warm forming in which press working is performed at a high temperature.

By the heat softening treatment, it is possible to suppress a crack, residual stress, stress corrosion cracking (SCC) caused by a corrosive environment, or the like when an extrusion material made of a high-strength aluminum alloy of 6000 series or 7000 series is subjected to press working. Extrusion materials made of aluminum alloys generally have high strength, and particularly, extrusion materials made of high-strength aluminum alloys of 6000 series or 7000 series are usually not suitable for press working which may be accompanied by cracking or the like. However, cracking or the like is suppressed by devising the heat softening treatment described above, and it is possible to perform press working on an extrusion material made of a high-strength aluminum alloy.

Preferably, the extrusion material 10 is made of an aluminum alloy of 6000 series or 7000 series, the extrusion material 10 is cut immediately after the formation of the extrusion material 10 (that is, immediately after extrusion from the extruder 110), and press working is performed after the cutting and before the natural aging of the extrusion material 10 is completed. More preferably, press working is performed before natural aging proceeds. Preferably, press working is performed before the Vickers hardness of the extrusion material 10 becomes 80 Hv or more.

Thus, the extrusion material made of a high-strength aluminum alloy of 6000 series or 7000 series can be subjected to cutting work and press working before the extrusion material is hardened by natural aging. Therefore, cracking associated with cutting work and press working can be suppressed.

(Modifications)

The cross-sectional shape of the door beam 10 is not limited to that of the above embodiment, and may be various.

Figure 12:
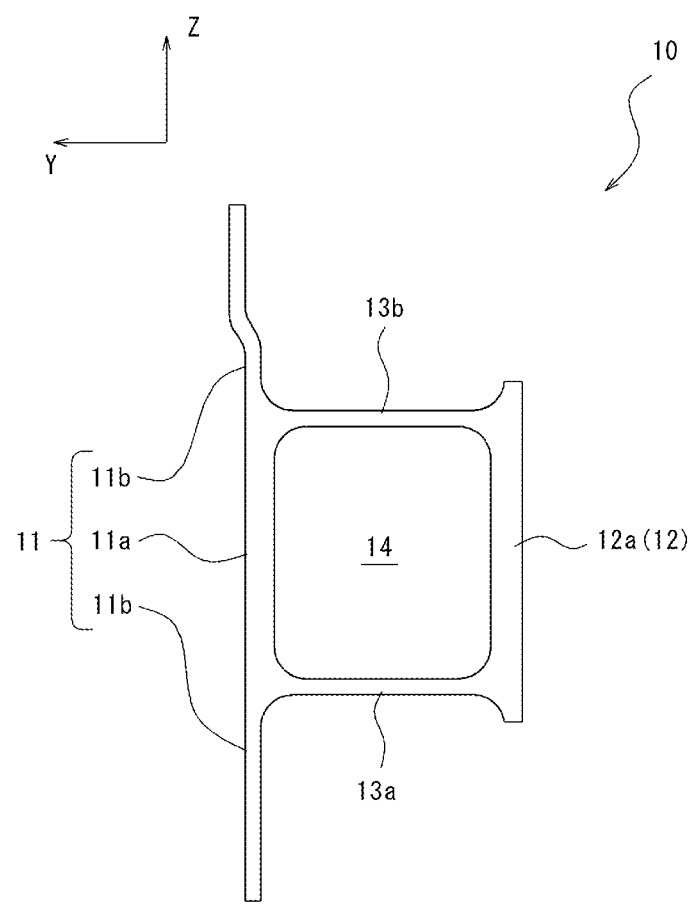
FIG. 12 is an end view perpendicular to the longitudinal direction of the vehicle door beam at the center in the longitudinal direction of a first modification.

Referring to FIG. 12, the inner protruding portions 12b (see FIG. 4) may be omitted in the cross-sectional shape of the door beam 10. By omitting the inner protruding portions 12b, the outer protruding portions 11b can be easily subjected to press working, and the weight of the door beam 10 can be further reduced.

Figure 13:
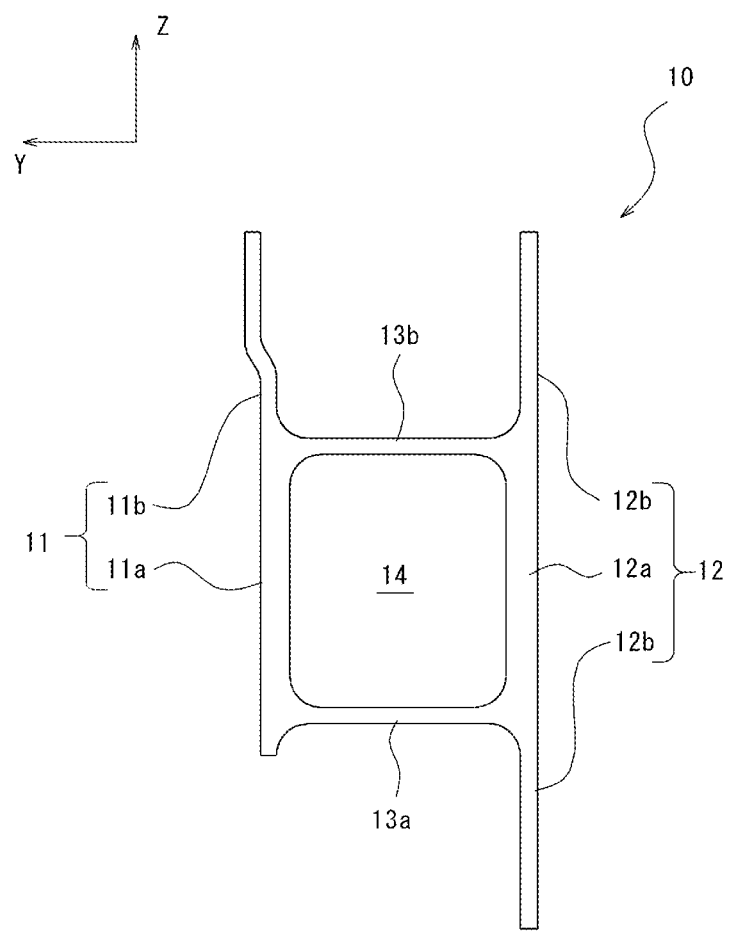
FIG. 13 is an end view perpendicular to the longitudinal direction of the vehicle door beam at the center in the longitudinal direction of a second modification.

Referring to FIG. 13, in the cross-sectional shape of the door beam 10, the outer protruding portion 11b may be provided only on one of the upper and lower sides of the closed cross-sectional portion 14. In the example of FIG. 13, the outer protruding portion 11b extending upward of the closed cross-sectional portion 14 is provided, and the outer protruding portion extending downward is omitted. The outer protruding portion 11b is not completely omitted unlike the inner protruding portion, and is necessary for forming the mastic press working portions 16.

Figure 14:
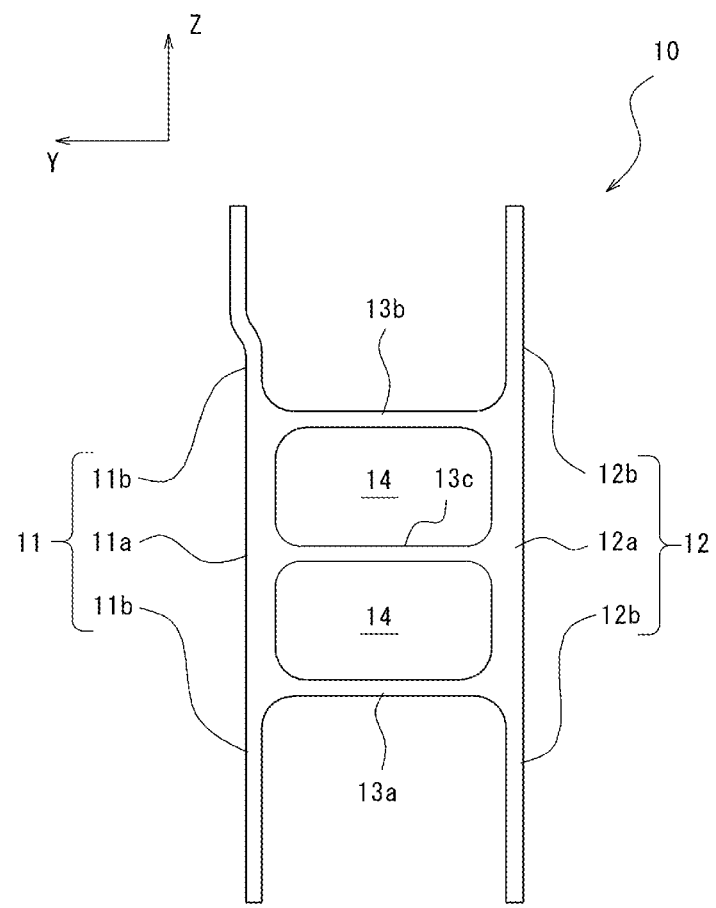
FIG. 14 is an end view perpendicular to the longitudinal direction of the vehicle door beam at the center in the longitudinal direction of a third modification.

Referring to FIG. 14, three parallel webs 13a to 13c may be provided in the cross-sectional shape of the door beam 10. In the example of FIG. 14, all the three webs 13a to 13c are arranged in parallel, but an arrangement mode of the webs 13a to 13c is not particularly limited, and may be arranged in any mode. In addition, the number of webs is not particularly limited, and four or more webs may be provided.

Figure 15:
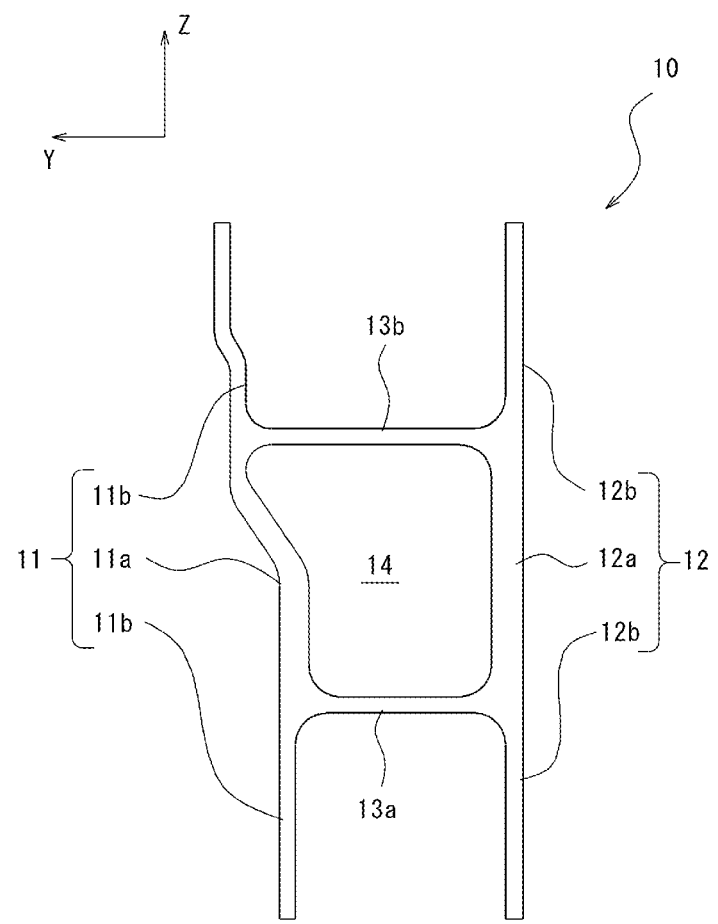
FIG. 15 is an end view perpendicular to the longitudinal direction of the vehicle door beam at the center in the longitudinal direction of a fourth modification.

Referring to FIG. 15, the outer central portion 11a may be curved in the cross-sectional shape of the door beam. In the example of FIG. 15, the outer central portion 11a is curved, so that the shape of the closed cross-sectional portion 14 is substantially trapezoidal. As described above, the shape of the closed cross-sectional portion 14 is not limited to a rectangle, and may be a trapezoid or any shape.

(Other Modifications)

The attachment mode of the door beam 10 is not limited to that of the above embodiment, and may be various.

Figure 16:
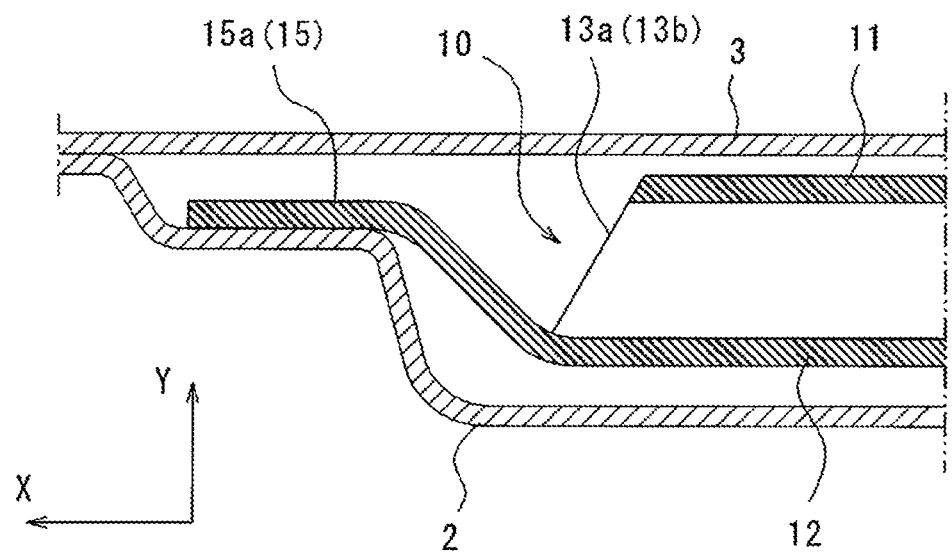
FIG. 16 is a schematic cross-sectional view illustrating a first modification of the attachment mode of the vehicle door beam on the vehicle front side.

Referring to FIG. 16, the outer flange 11 facing the front attachment portion 15a and the pair of webs 13a and 13b connected to the outer flange 11 may be cut out and removed. As a result, only the inner flange 12 is left at the end portion on the vehicle front side, and the inner flange 12 can be subjected to press working to easily form the front attachment portion 15a.

Figure 17:
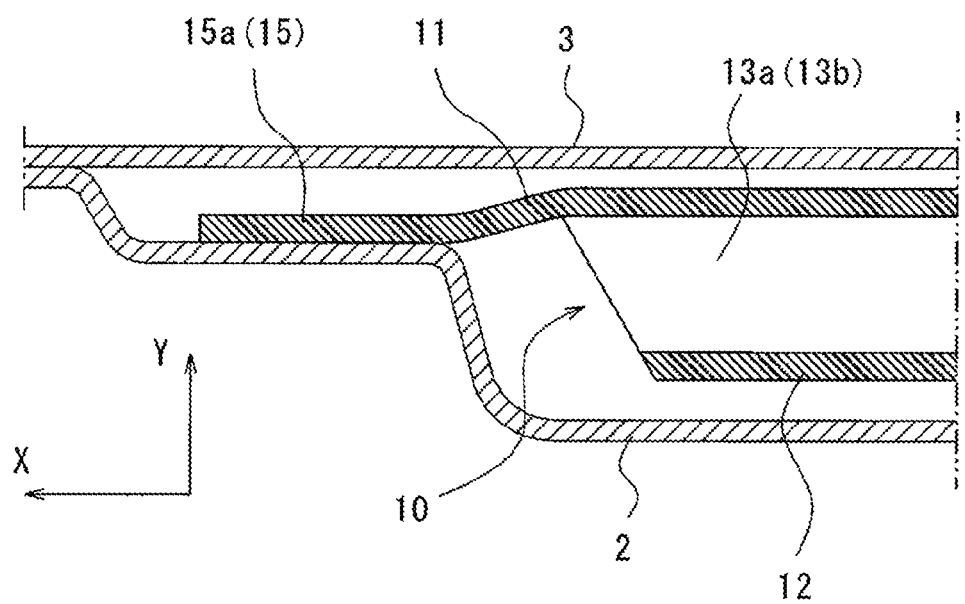
FIG. 17 is a schematic cross-sectional view illustrating a second modification of the attachment mode of the vehicle door beam on the vehicle front side.

Referring to FIG. 17, the attachment press working portion 15 may be formed on the outer flange 11 instead of the inner flange 12. In the example of FIG. 17, the inner flange 12 and the pair of webs 13a and 13b are cut out and removed at the end portion on the vehicle front side. As a result, only the outer flange 11 is left at the end portion on the vehicle front side, and the front attachment portion 15a can be easily formed by performing press working on the outer flange 11.

Figure 18:
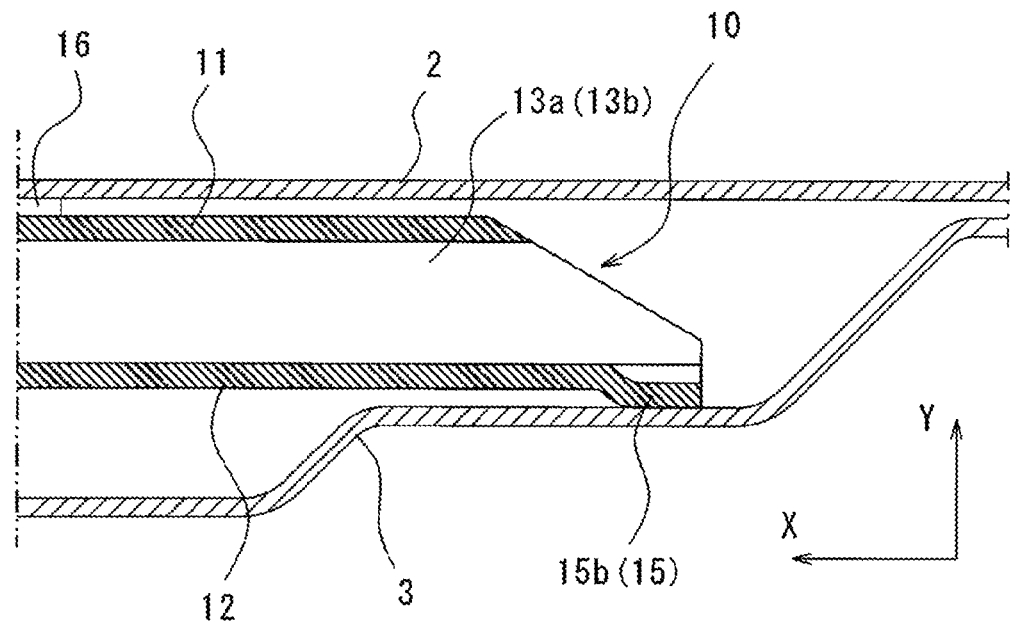
FIG. 18 is a schematic cross-sectional view illustrating a first modification of the attachment mode of the vehicle door beam on the vehicle rear side.
Figure 19:
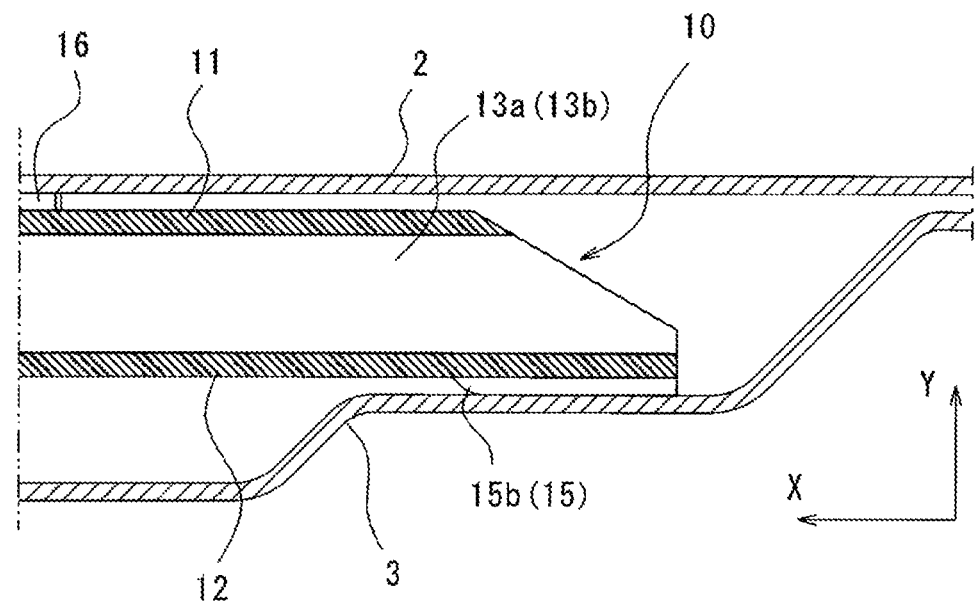
FIG. 19 is a schematic cross-sectional view illustrating a second modification of the attachment mode of the vehicle door beam on the vehicle rear side.

Referring to FIGS. 18 and 19, on the vehicle rear side, the rear attachment portion 15b may be formed only in the inner central portion 12a or only in the inner protruding portion 12b. FIG. 18 illustrates an example in which the rear attachment portion 15b is formed only in the inner central portion 12a, and FIG. 19 illustrates an example in which the rear attachment portion 15b is formed only in the inner protruding portion 12b.

Although specific embodiments of the present invention and modifications thereof have been described above, the present invention is not limited to the above embodiments, and various modifications can be made within the scope of the present invention. For example, an appropriate combination of the contents of individual modifications may be an embodiment of the present invention.

The invention claimed is:

1. A vehicle door beam disposed between an outer panel and an inner panel of a vehicle door and made of an extrusion material of an aluminum alloy, the vehicle door beam comprising:
   an outer flange facing the outer panel;
   an inner flange facing the inner panel; and
   a pair of webs connecting the outer flange and the inner flange,
   wherein the outer flange, the inner flange, and the pair of webs define a closed cross-sectional portion,
   wherein the outer flange includes an outer central portion constituting a part of the closed cross-sectional portion and an outer protruding portion protruding outward from the closed cross-sectional portion,
   wherein the inner flange or the outer flange is formed with an attachment press working portion having been subjected to press working so as to serve as an attachment portion with respect to the inner panel at at least one end portion in a longitudinal direction, and
   wherein the outer protruding portion is formed with a mastic press working portion having been subjected to press working so as to serve as a mastic portion with respect to the outer panel.

2. The vehicle door beam according to claim 1, wherein the inner flange or the outer flange is formed with the attachment press working portion at each of both end portions in the longitudinal direction.

3. The vehicle door beam according to claim 1, wherein, in the inner flange and the outer flange, both end portions in the longitudinal direction excluding the attachment press working portion and the mastic press working portion are removed.

4. The vehicle door beam according to claim 1, which is made of an extrusion material of an aluminum alloy of 6000 series or 7000 series.

5. The vehicle door beam according to claim 1, wherein the outer protruding portion is thinner than the outer central portion.

6. The vehicle door beam according to claim 2, wherein, in the inner flange and the outer flange, both end portions in the longitudinal direction excluding the attachment press working portion and the mastic press working portion are removed.

7. The vehicle door beam according to claim 2, which is made of an extrusion material of an aluminum alloy of 6000 series or 7000 series.

8. The vehicle door beam according to claim 2, wherein the outer protruding portion is thinner than the outer central portion.

9. A method for manufacturing a vehicle door beam disposed between an outer panel and an inner panel of a vehicle door, the method comprising:
 forming an extrusion material by extruding a material of an aluminum alloy, the extrusion material including an outer flange facing the outer panel, an inner flange facing the inner panel, and a pair of webs connecting the outer flange and the inner flange, the outer flange, the inner flange, and the pair of webs defining a closed cross-sectional portion, the outer flange including an outer central portion constituting the closed cross-sectional portion and an outer protruding portion protruding outward from the closed cross-sectional portion;
 cutting the extrusion material to a predetermined length; and
 forming a mastic press working portion serving as a mastic portion with respect to the outer panel on the outer protruding portion by performing press working on the cut extrusion material at a same time or in a same process as formation of an attachment press working portion serving as an attachment portion with respect to the inner panel at at least one end portion in a longitudinal direction on the inner flange or the outer flange.

10. The method for manufacturing a vehicle door beam according to claim 9, wherein the extrusion material is made of an aluminum alloy of 6000 series or 7000 series, and is subjected to a heat softening treatment before or during the press working.

11. The method for manufacturing a vehicle door beam according to claim 9, wherein the extrusion material is made of an aluminum alloy of 6000 series or 7000 series, the extrusion material is cut immediately after formation of the extrusion material, and the press working is performed after the cutting and before natural aging of the extrusion material proceeds.

* * * * *